United States Patent
Gilboa-Solomon et al.

(10) Patent No.: US 9,373,360 B2
(45) Date of Patent: Jun. 21, 2016

(54) INSTANTANEOUS PREVIEW OF DATA ASSOCIATED WITH A VIDEO

(71) Applicant: International Business Machines Corporation, Armonk, NY (US)

(72) Inventors: Fora Gilboa-Solomon, Haifa (IL); Dror Porat, Haifa (IL); Mattias Marder, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 14/321,835

(22) Filed: Jul. 2, 2014

(65) Prior Publication Data

US 2016/0006979 A1    Jan. 7, 2016

(51) Int. Cl.
*H04N 9/80* (2006.01)
*G11B 27/34* (2006.01)
*G11B 27/00* (2006.01)
*G11B 27/19* (2006.01)

(52) U.S. Cl.
CPC .............. *G11B 27/34* (2013.01); *G11B 27/005* (2013.01); *G11B 27/19* (2013.01)

(58) Field of Classification Search
CPC ...... H04N 5/9201; G11B 27/34; G11B 27/19; G11B 27/005
USPC .......................... 386/248, 239, 245, 241, 323
See application file for complete search history.

(56) References Cited

U.S. PATENT DOCUMENTS

| | | | |
|---|---|---|---|
| 8,190,605 B2 | 5/2012 | Kuhlke et al. | |
| 8,488,011 B2 | 7/2013 | Blanchflower et al. | |
| 8,548,735 B2 | 10/2013 | Forstall et al. | |
| 9,202,522 B2* | 12/2015 | Dhawan | G11B 27/005 |
| 2011/0007134 A1 | 1/2011 | Knize et al. | |
| 2011/0145256 A1 | 6/2011 | Dunkel et al. | |
| 2012/0314068 A1 | 12/2012 | Schultz | |
| 2013/0166998 A1 | 6/2013 | Sutherland | |
| 2014/0133824 A1* | 5/2014 | Yoel | G11B 27/105 386/201 |

OTHER PUBLICATIONS

Zhang et al.,"Presentation of Geo-Referenced Videos With Google Earth", SMVC '10 Proceedings of the 2010 ACM workshop on Surreal media and virtual cloning, pp. 21-26, 2010.
Christel et al., "Interactive Maps for a Digital Video Library", IEEE International Conference on Multimedia Computing and Systems, Jul. 1999, vol. 1, pp. 381-387.
Kim et al., "Geosearch: Georeferenced Video Retrieval System", KDD '12 Proceedings of the 18th ACM SIGKDD international conference on Knowledge discovery and data mining, Aug. 2012, pp. 1540-1543.

* cited by examiner

*Primary Examiner* — Robert Chevalier (57) ABSTRACT

A method comprising using at least one hardware processor for receiving a video and metadata associated with the video, indicating, in a video player, a current time in the video, receiving an indication of a different time in the video and responsive to said receiving of the indication, displaying a datum of the metadata, wherein the datum is correlated with the different time in the video.

17 Claims, 5 Drawing Sheets

Fig. 5

INSTANTANEOUS PREVIEW OF DATA ASSOCIATED WITH A VIDEO

BACKGROUND

The present invention relates to the field of visualization of data associated with a video.

Videos are played and watched commonly on video players for various purposes such as work-related purposes or just for fun. A video player may play digital video data from media such as optical discs (for example, Digital Versatile Disc (DVD)), as well as from files of appropriate formats such as Moving Picture Experts Group (MPEG). In addition to functions such as playing, pausing, stopping, rewinding, and forwarding, some common functions include zooming/full screen, audio channel selection, subtitle selection, and frame capturing.

The term "metadata" means information with respect to data. The term may relate to two different concepts: structural metadata or descriptive metadata. Descriptive metadata is about individual instances of application data, the data content. Metadata are traditionally found in the card catalogs of libraries. As information has become increasingly digital, metadata are also used to describe digital data using metadata standards specific to a particular discipline. By describing the contents and context of data files, the quality of the original data/files is greatly increased. For example, a webpage may include metadata specifying what language it is written in, what tools were used to create it, and where to go for more on the subject, allowing browsers to automatically improve the experience of users. Metadata are particularly useful in video and may include information about its contents (such as transcripts of conversations and text descriptions of its scenes).

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving a video and metadata associated with the video; indicating, in a video player, a current time in the video; receiving an indication of a different time in the video; and responsive to said receiving of the indication, displaying a datum of the metadata, wherein the datum is correlated with the different time in the video.

There is further provided, in accordance with an embodiment, a computer program product comprising a non-transitory computer-readable storage medium having program code embodied therewith, the program code executable by at least one hardware processor to: receive a video and metadata associated with the video; indicate, in a video player, a current time in the video; receive an indication of a different time in the video; and responsive to said receiving of the indication, display a datum of the metadata, wherein the datum is correlated with the different time in the video.

There is yet further provided, in accordance with an embodiment, a method comprising receiving a video comprising sequential frames each associated with at least one information tag selected from the group consisting of: geographic location, a subtitle, a video parameter and a camera parameter; loading the video into a video player comprising a time bar; receiving a first time reference to a selected start frame in the video by said time bar; receiving a second time reference to a selected end frame in the video by said time bar; and responsive to said receiving of the first and second time references, displaying the information tag associated with the start frame, the information tag associated with the end frame and the information tags associated with the frames therebetween.

In some embodiments, the video comprises frames associated with the metadata, the frames being of a plurality of sites, and wherein the metadata comprises geo-references to the plurality of sites correspondingly, the method further comprising using the at least one hardware processor for: retrieving one or more maps comprising the plurality of sites based on the geo-references, wherein the displaying of the datum comprises displaying a geographic location of a site of said plurality of sites of a frame of said frames associated with the datum based on its corresponding geo-reference, and wherein the geographic location is being displayed as a symbol superimposed correspondingly on a map of said one or more maps.

In some embodiments, the geo-references comprise geographic coordinates of the plurality of sites correspondingly.

In some embodiments, the retrieving of the one or more maps comprises: determining the maximal and minimal longitudes and latitudes of the geographic coordinates; and retrieving a map comprising at least an area restricted by said maximal and minimal longitudes and latitudes.

In some embodiments, the video comprises one or more frames of one or more sites which are not associated with metadata comprising corresponding geo-references, the method comprising using the at least one hardware processor further for interpolating geo-references for a frame of the one or more frames based on geo-references of metadata associated with adjacent frames of said frames indicated by the video player as temporally adjacent in the video to the frame.

In some embodiments, the at least one hardware processor is further used for displaying the at least some of the remainder of the metadata, the displaying comprises displaying geographic locations of associated at least some of the remainder of said plurality of sites as one or more symbols superimposed correspondingly on the map, wherein the displaying of the geographic locations is based on the associated at least some of the remainder of the geo-references and with respect to the displayed datum.

In some embodiments, the displaying of the at least some of the remainder of the metadata with respect to the displayed datum is in a temporal manner, wherein the at least some of the remainder of the metadata is correlated with time in the video indicated in the video player.

In some embodiments, the displaying of the at least some of the remainder of the metadata comprises color-coding of the one or more symbols according to a temporal sequence of the correlated time in the video indicated in the video player and with respect to the different time.

In some embodiments, the displaying of the at least some of the remainder of the metadata comprises determining the thickness of the delimiting line of a symbol of the one or more symbols to be with respect to the time difference between a time in the video corresponding to the symbol and the different time.

In some embodiments, the at least one hardware processor is further used for displaying the geographic distribution of at least some of the remainder of the plurality of sites on the map based on the associated at least some of the remainder of the geo-references and with respect to the displaying of the datum.

In some embodiments, the displaying comprises visualizing the datum and wherein visualizing the datum comprises processing the different time and the datum correlated with the different time.

In some embodiments, said processing is performed offline for each possible indication of time in the video.

In some embodiments, said processing is performed online.

In some embodiments, the receiving of an indication of a different time in the video comprises receiving a time location on a time bar of the video player indicated by an input device operated by a user of the video player.

In some embodiments, the metadata is selected from the group consisting of: geographic location, a subtitle, a video parameter and a camera parameter.

In some embodiments, the video comprises frames associated with the metadata, the frames being of a plurality of sites, the metadata comprises geo-references to the plurality of sites correspondingly, and the program code further executable by said one hardware processor to: retrieve one or more maps comprising the plurality of sites based on the geo-references, wherein the display of the datum comprises displaying a geographic location of a site of said plurality of sites of a frame of said frames associated with the datum based on its corresponding geo-reference, and wherein the geographic location is being displayed as a symbol superimposed correspondingly on a map of said one or more maps.

In some embodiments, the program code is further executable by said one hardware processor to display associated at least some of the remainder of the metadata, the display comprises displaying geographic locations of the associated at least some of the remainder of said plurality of sites as one or more symbols superimposed correspondingly on the map, wherein the displaying of the geographic locations is based on the associated at least some of the remainder of the geo-references and with respect to the displayed datum.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Methods and computer program products are disclosed herein, allowing instantaneous preview of data associated with a video by using simple and effective visualization. The instantaneous preview may allow a user to instantly grasp the context and/or content of the video and may further allow the user to quickly jump to another segment of the video having a content of interest.

The terms "metadata", "data" and "datum", as referred to herein, may relate to information of one or more context. The term "datum", as referred to herein, may relate to an information packet associated with a frame.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
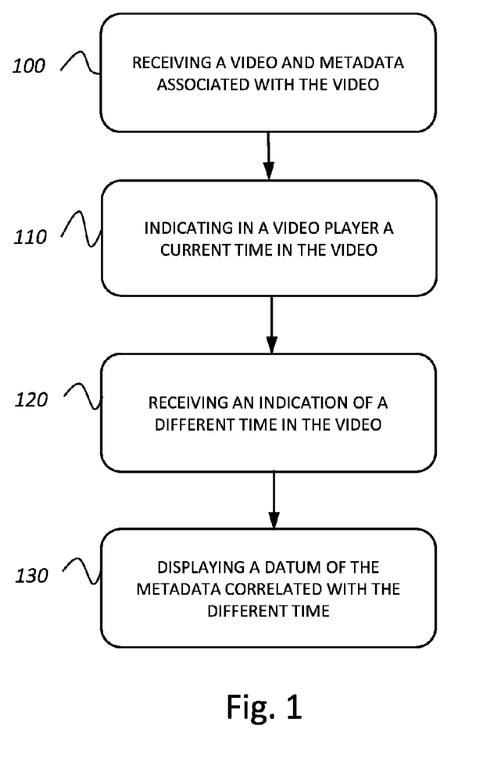
FIG. 1 shows a flowchart of a method, constructed and operative in accordance with an embodiment of the disclosed technique.

Reference is now made to FIG. 1 which shows a flowchart of a method, constructed and operative in accordance with an embodiment of the disclosed technique. In a step 100, a video and metadata associated with the video may be received. The video may include sequential frames where each of at least some of the frames may be associated with a datum of the metadata. A datum of the metadata may be associated with one or more frames. Such metadata may be contextual to the video. For example, the metadata may provide geographic information relating to a site shown in the video, subtitles including translation of talk or text or transcription of talk included in the video, a video parameter, a parameter of the camera used to record the video, etc. The metadata may include the actual desired data (e.g., in the form of text, graphics, etc.) or links to the desired data stored in a network-accessible location, such as a remote server connectable through the Internet.

In some embodiments, a video file which includes both the video and the associated metadata may be received. In some embodiments, a video file which includes the video, and a data file which includes the associated metadata, may be separately received.

In some embodiments, the video may be correlated with the metadata via the video player. For example, the video may be correlated with the metadata by time which may be maintained by the video player. In such a case, frames of the video may each be correlated with a corresponding time maintained and indicated by the video player and according to the sequential order of the frames. Datum of the metadata may be then correlated with the time corresponding to the frame which the datum relates to.

In some embodiments, the received video may include video frames captured by a video camera mounted on a moving platform such as an overland vehicle, an aerial vehicle and/or a marine vehicle—each manned or unmanned. In some embodiments, the video may include video frames captured by a video camera mounted on a fixed platform such as a building, a pillar, and/or the like.

In a step 110, a current time in the video may be indicated in a video player. The video may be loaded into the video player which may maintain time. The video player may include, for example, a time bar for indicating the current time in a loaded video and the passing of time in the video while the video is playing. Prior to playing of the video (i.e., not following pausing) the current time may be indicated as zero.

In a step 120, an indication of a different time (i.e., different from the current time) in the video may be received. The receiving of an indication of a different time in the video may include, for example, receiving a time location on a time bar of the video player (i.e., a location on the time bar associated with time in the video) indicated by an input device operated by a user of the video player. The user may use, for example, a pointing device such as a mouse to hover over a location on the time bar, or use a touch screen to touch such a location on the time bar. Optionally, an indication of the current time in the video may be received.

In a step 130, responsive to the receiving of the indication, a datum of the metadata which is correlated with the different time in the video may be displayed. In some embodiments, the datum may be displayed on the video player, for example superimposed on the video. In some embodiments, the datum may be displayed adjacently to the video player.

The displaying of the datum may include visualization of the datum. The visualization of the datum may include processing of the different time and the correlated datum. Visualization of the datum may include, for example, generating an image including a map indicating a specific geographic location based on the processing of datum including geographic coordinates of the geographic location. Such an image may present the map in a scroll view and/or may allow performing operation on the map such as zoom in and out manually or automatically. The displaying of the datum may then include, for example, displaying the generated image.

In some embodiments, the processing and optionally, the visualization may be performed offline for each possible indication of time in the video. For example, an image may be generated for each indication of time where the displaying of the image may be performed online in response to receiving of the time indication. In some embodiments, the processing and visualization may be performed online, i.e., once a time indication is received.

In some embodiments, the video may include frames of a plurality of sites and the metadata associated with the frames may include information of geographic context. Optionally, the metadata may include geo-references to the sites correspondingly. The geo-references may include geographic information with respect to the sites. For example, the geo-references may include the geographic location of the sites, i.e., geographic coordinates, and/or may include references to geographic information such as links to maps including the sites. Thus, a geo-reference associated with a frame may, for example, include the geographic coordinates (i.e., longitude and latitude) of the site shown in the frame.

In such embodiments, the method may further include a step of retrieving one or more maps which include the sites based on the geo-references. The step of retrieving the one or more maps may include retrieving a map which includes a predefined area. Such area may be restricted and therefore defined by the maximal and minimal longitudes and latitudes of the geographic coordinates of the sites. As a result of that, the retrieved map may include all of the geo-referenced sites shown in the video. In some embodiments the map may include an area larger than the restricted area in order to provide a broader context.

In some embodiments, the one or more maps may be retrieved from a map server. The geo-references may be provided to a map server which in turn provides one or more maps which include the geo-referenced sites. Thus, geo-references including geographic information with respect to sites shown in the video may be provided to a map server and one or more maps including the sites may be received.

In some embodiments, a desired map resolution may be provided. One or more maps may be retrieved based on the desired map resolution and the geo references. The map resolution may determine the geographic size of the one or more maps and therefore the number of maps required to cover all of the geo-referenced sites. This is since the one or more maps may be displayed (as described in more details herein below) and therefore may be restricted by a desired display size.

In some embodiments, displaying of a datum which includes a geo-reference may include displaying the geographic location of the site shown in the frame which is associated with the datum. The geographic location of the site may be displayed based on its corresponding geo-reference. The geographic location may be displayed as a symbol superimposed correspondingly on a retrieved relevant map (i.e., including the geographic location). The symbol may be, for example, a point, a circle or a polygon. The size of the symbol may be with respect to the size of the corresponding geographic location, as shown in the corresponding frame (i.e., the field of view of the image shown in the frame). The size of the shown geographic location may vary from frame to frame due to changes such as the field of view, zoom or direction of the camera.<Flora: please consider, if need, to emphasize that the symbol shape and size may vary from frame to frame since the video camera may change its zoom/field of view/direction>

Figure 2:
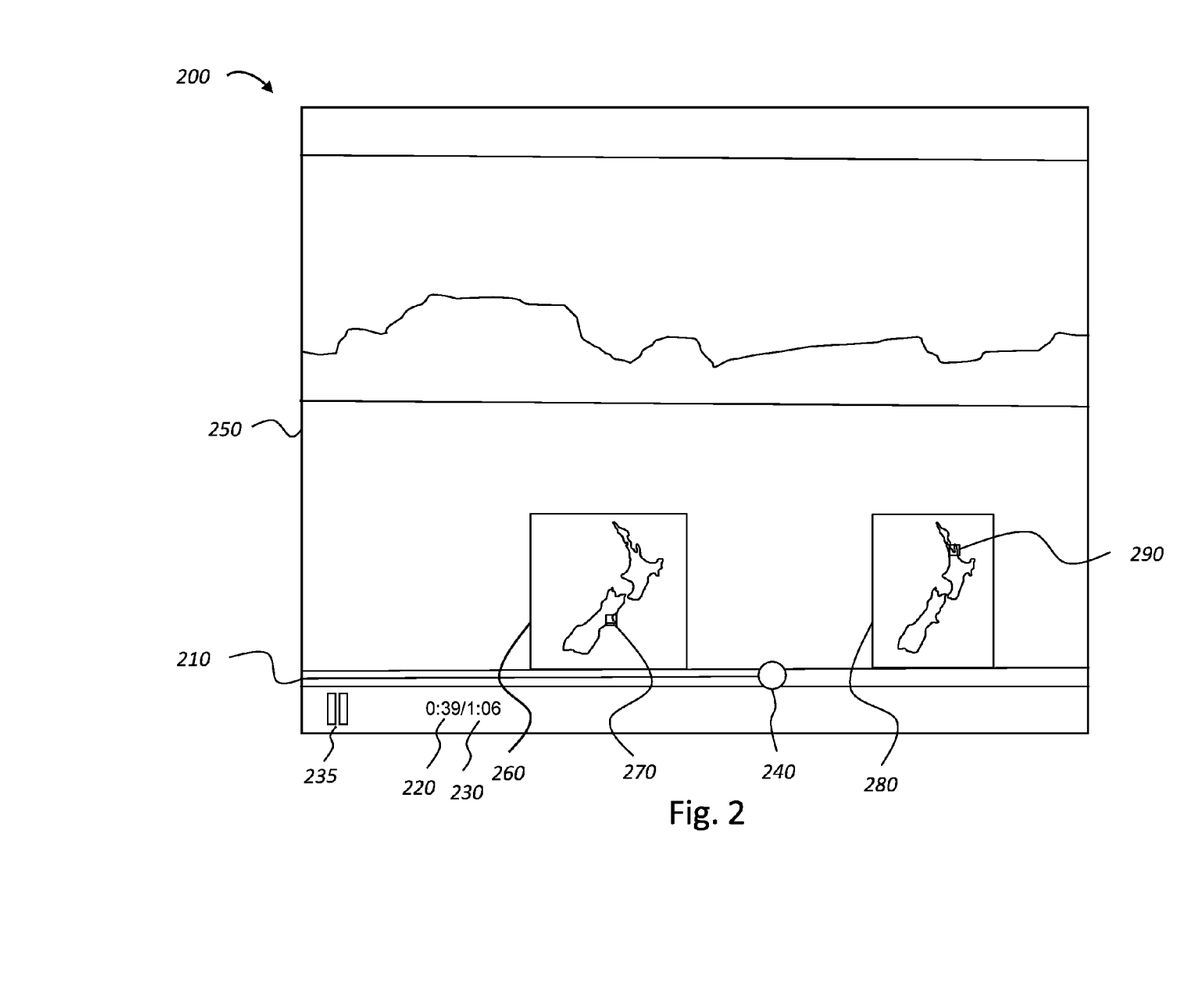
FIG. 2 shows a schematic illustration of an exemplary video player displaying a frame of an exemplary video and thereon previews showing the geographical location of a previous frame and of a future frame.

Reference is now made to FIG. 2, which shows a schematic illustration of an exemplary video player 200 displaying a frame 250 of an exemplary video and, thereon, previews showing the geographical location of a previous frame and of a future frame. The exemplary video may include frames of a plurality of sites, for example, sites in New Zealand. Video player 200 may include controls such as a play/stop button 235. Video player 200 may include a visual time indicator of time position in the video, such as a time bar 210 indicating the passing of time and the current time in the video. The visual time indicator may include a mark indicating the current time and/or the passing of time in the video. For example, circular marking 240, which advances along the time bar as the time in the video passes. The location of marking 240 on time bar 210 may indicate the current time in the video. The current time may be further displayed as text 220 on a bottom portion of video player 200. Text 220 may indicate the time that has passed in the video in time units (e.g., hours, minutes and/or seconds). Text 230, which is positioned adjacent to text 220, may indicate the total time duration of the video in the time units.

A preview 260 showing a map of New Zealand may be displayed above a first time location on time bar 210 which precedes the current time as indicated by marking 240. A preview 280 also showing a map of New Zealand may be displayed above a second time location on time bar 210 which follows the current time. Polygonal symbol 270 may be superimposed on the map shown in preview 260 on a first geographic location. Polygonal symbol 290 is superimposed on the map shown in preview 280 on a second geographic location. A map according to the disclosed technique may be displayed in various locations on the video player or adjacent to the video player. The size of the preview, e.g., preview 260 and preview 280, may be determined such that it would be legible to a viewer. In case the preview is displayed on the video player, the location and size of the preview may be further determined such that it would obstruct the view of the displayed frame as less as possible.

Preview 260 may be displayed in response to receiving an indication of a first time in the video corresponding to the first time location on time bar 210. Preview 280 may be displayed in response to receiving an indication of a second time in the video corresponding to the second time location on time bar 210. The indication of the first or the second time may be received by indicating the first time location or the second time location correspondingly. The indication may be performed by a user of video player 200 using an input device, for example, a mouse, to hover on the first or the second time location on the time bar, correspondingly.

Once the user hovers with the mouse over the first time location, an indication of the first time may be received. In response, preview 260 may be displayed above the first time location with polygonal symbol 270 superimposed on the geographic location of the site shown in the frame which may be displayed by video player 200 in the first time. Once the user hovers with the mouse over the second time location, an indication of the second time may be received. In response, preview 280 may be displayed above the second time location with polygonal symbol 290 superimposed on the geographic location of the site shown in the frame which is displayed by video player 200 in the second time. Thus, a user may receive geographic information while watching a video with respect to a preceding frame or a following frame, e.g., the geographic location of sites shown in these frames. Furthermore, if the user is interested in a specific geographic location, he may locate the time in the video (i.e., the correlated frame) in which this location is shown by indicating time locations on the time bar. Once the desired frame is located, the user may play the desired frame (e.g., by clicking on the desired time location on the time bar).

In some embodiments, the symbol superimposed on the map may be displayed for a predefined time length. In such a case preview 260 and preview 280 may be displayed at the same time as shown in FIG. 2, e.g., when a user hovers with the mouse over the first time location, and before the predefined time length ends, hovers with the mouse over the second time location. In some embodiments the symbol superimposed on the map may be displayed as long as the time indication is received, e.g., as long as the user hovers with a mouse over the corresponding time location on the time bar. In such a case preview 260 and preview 280 may not be displayed at the same time as shown in FIG. 2.

In some embodiments, the video may include one or more frames of one or more sites which are not associated with metadata that includes corresponding geo-references (i.e., not geo-referenced). In such a case, the method may include a step of interpolating geo-references for the frames which are not geo-referenced. The interpolating of geo-references for each such frame may be performed based on the geo-references of metadata associated with adjacent frames, i.e., indicated by the video player as temporally adjacent in the video to the frame.

In some embodiments, the method may further include a step of displaying at least some of the remainder of the metadata which includes geo-references to sites shown in the frames (i.e., other than the datum). Optionally, the geographic locations of the at least some of the remainder of the sites (i.e., other than the site geo-referenced by the datum) associated with the at least some of the remainder of the metadata may be displayed as one or more symbols superimposed correspondingly on the map. The displaying of the geographic locations may be based on the at least some of the remainder of the geo-references associated with the at least some of the remainder of the sites and with respect to the displayed datum. Such a display may visualize for a user of the video player the geographic route covered by the video. In some embodiments the size and/or shape of a symbol may correspond to the size and/or shape of the site (i.e., as shown on the map) having the geographic location which is displayed as the symbol.

Figure 3:
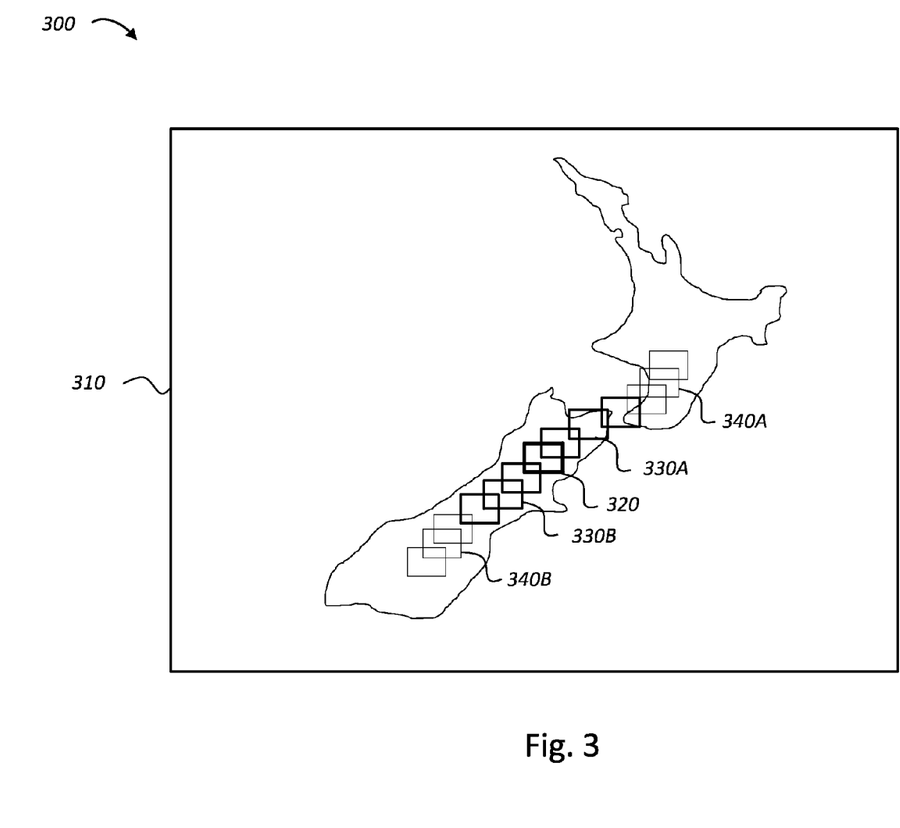
FIG. 3 shows a schematic illustration of an exemplary preview temporally visualizing geographic locations of sites of video frames with respect to a geographic location of a site of a selected frame.

Reference is now made to FIG. 3 which shows a schematic illustration of an exemplary preview 300 temporally visualizing geographic locations of sites of video frames with respect to a geographic location of a site of a selected frame. Preview 300 includes a map 310 of New Zealand. Preview 300 visualizes the geographic locations of video frames (i.e., of sites shown in the video frames) as symbols superimposed on map 310. A polygonal symbol 320 may be superimposed on the geographic location of the site geo-referenced by the datum, i.e., the site shown in a selected frame (e.g., selected by a user by hovering with a mouse over a time location on the time bar of the video player). Polygonal symbols 330A, 330B, 340A and 340B, for example, are symbols superimposed on geographic locations of some of the remainder of the sites shown in the frames.

In some embodiments, at least some of the remainder of the metadata may be displayed with respect to the displayed datum in a temporal manner. Such a display may be enabled, for example, by correlating the at least some of the remainder of the metadata with time in the video indicated in the video player. Thus, the datum and the at least some of the remainder of the metadata may be correlated with time in the video. Such a display may be performed by determining values to one or more graphic characteristics of the displayed metadata with respect to its temporal characteristics. A user may select the portion of the remainder of the metadata (or all of it) to be displayed.

In some embodiments, the displaying of the at least some of remainder of the metadata may include coding of a graphic characteristic of the one or more symbols, such as color-coding. The coding may be according to a temporal sequence of the correlated time in the video indicated in the video player and with respect to the different time. For example, the symbol representing the datum may be colored with a first color. The one or more symbols preceding the different time (i.e., correlated with the datum) according to the temporal sequence of the correlated time in the video may be colored with a second color. The one or more symbols following the different time according to the temporal sequence of the correlated time in the video may be colored with a third color. Furthermore, the color-coding may be with respect to the temporal distance from the different time, i.e., by color shading. Such color-coding may visualize to a user the temporal sequence of the sites as shown in the video. Such visualization may also direct the user to the portion in the video which is of geographic interest to him, as the color may indicate a location and/or distance in time (i.e., in the playing sequence of the video frames). Thus, a user may receive an indication of how further in the time line of the video a geographic location, which is of interest to the user, is shown. (Flora: Consider adding motivation—The color coding purpose is to serve as a seek helper, meaning it gives the user a hint about how far in time is the geographic location of interest)

In some embodiments, the displaying of the at least some of the remainder of the metadata includes determining one or more graphic characteristics of each symbol, such as the thickness of the delimiting line of each symbol, to be with respect to the time difference between a time in the video corresponding to the symbol and the different time. The time in the video corresponding to the symbol may be the time correlated with a datum of the metadata associated with the frame of the site having the geographic location which is displayed as the symbol.

For example, polygonal symbol 320 has the thickest delimiting line since it is superimposed on the geographical location of the datum correlated with the different time. Polygonal symbols 330A and 330B have a delimiting line which is less thick and relative to the time difference between the times correlated with these symbols and the different time correspondingly. Polygonal symbols 340A and 340B have a delimiting line which is the thinnest one thus indicating that the time difference between the times correlated with these symbols and the different time is the largest.

Figure 4:
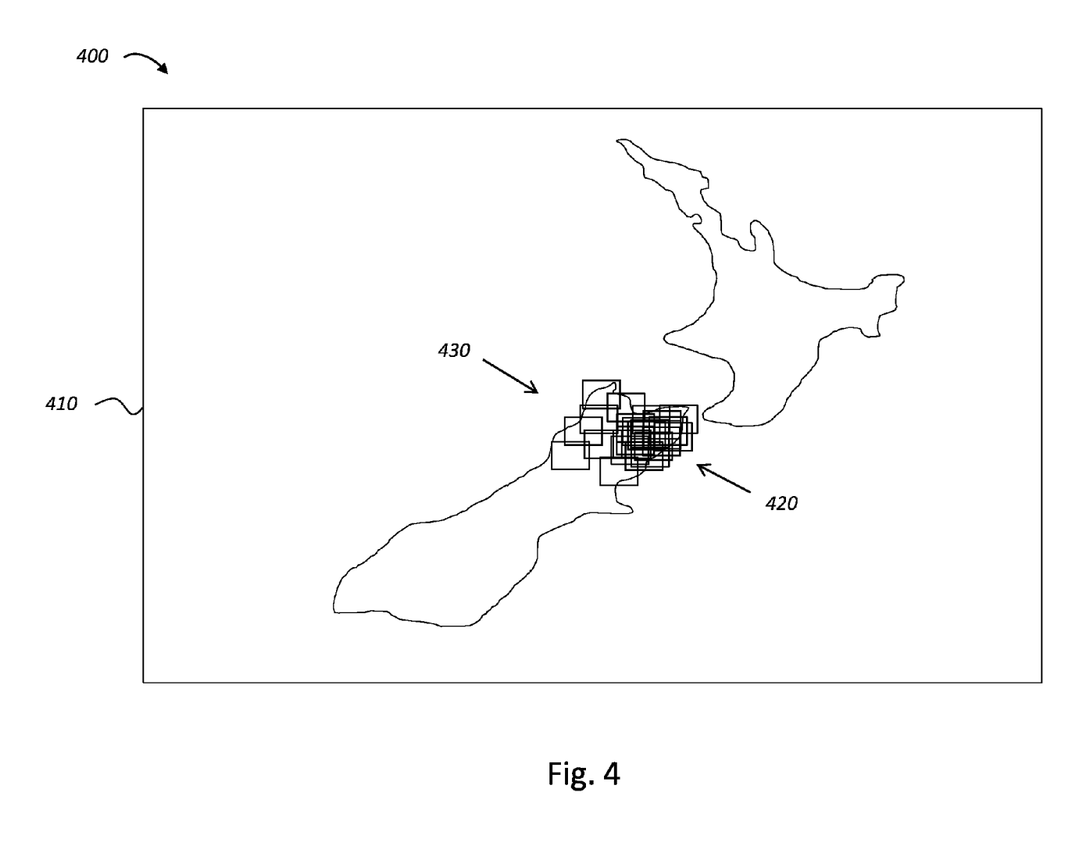
FIG. 4 shows a schematic illustration of an exemplary preview visualizing the geographic distribution of sites shown in a video.

In some embodiments, the method may further include a step of displaying the geographic distribution of the at least some of remainder of the plurality of sites on the map based on the at least some of the remainder of the geo-references associated with the at least some of remainder of the plurality of sites and with respect to the displaying of the datum.

Reference is now made to FIG. 4 which shows an exemplary preview 400 visualizing the geographic distribution of sites shown in a video. Each site may be displayed as a polygonal symbol superimposed on its geographic location on a map 410 of New Zealand. Arrow 420 indicates a dense area including multiple polygonal symbols where as arrow 430 indicated a less dense area including fewer polygonal symbols.

In some embodiments, one or more maps displaying the plurality of sites shown in the video may be displayed once the video is loaded into the video player or once or while the video is played by it. A user may use the map to manipulate the playing of the video by the video player. For example, the user may indicate (i.e., by an input device) a certain site on the map and in response the video player may display and/or play a frame showing this site or highlight or place the mark in the time bar which indicates the passing of time in a location in the time bar corresponding to such frame. Such one or more maps may be displayed on the video player and/or next to it.

Figure 5:
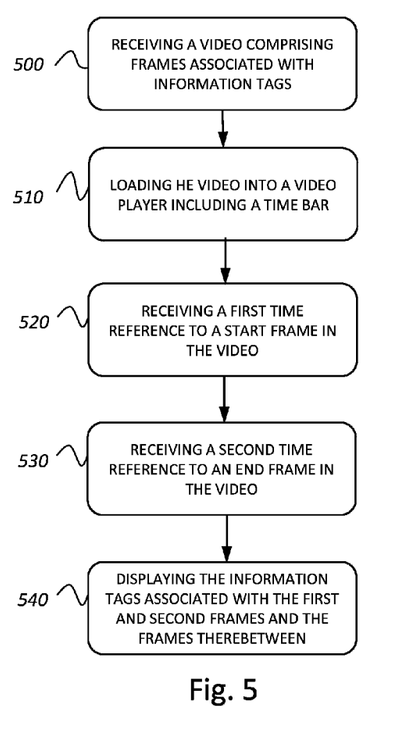
FIG. 5 shows a flowchart of another method, constructed and operative in accordance with another embodiment of the disclosed technique.

Reference is now made to FIG. 5 which shows a flowchart of another method, constructed and operative in accordance with another embodiment of the disclosed technique. The method of FIG. 5 may be similar to the method of FIG. 1 with the necessary modifications.

In a step 500, a video which may include sequential frames may be received. Each of the frames may be associated with at least one information tag. The information tag may include, for example, a geographic location, a subtitle, a video parameter or a camera parameter.

In a step 510, the video may be loaded into a video player. The video player may include a time bar. The time bar may indicate time in the video such that each time location on the time bar may be correlated with a frame of the video. The video player may be video player 200 of FIG. 2 with the necessary modifications.

In a step 520, a first time reference to a start frame in the video may be received by utilizing the time bar. For example, a user may indicate with an input device (e.g., a mouse or a touch screen) a first time location on the time bar. The frame correlated with the first time location may be the start frame.

In a step 530, a second time reference to an end frame in the video may be received by utilizing the time bar. For example, a user may indicate with an input device (e.g., a mouse or a touch screen) a second time location, temporally following the first time location, on the time bar. The frame correlated with the second time location may be the start frame. Optionally, a user may indicate two different time locations on the time bar, while the frame which is associated with the time location which is first in the temporal sequence of the video may be determined as the start frame and the frame which is associated with the time location which follows with respect to the temporal sequence of the video may be determined as the end frame.

In a step 530, the information tag associated with the start frame, the information tag associated with the end frame and the information tags associated with the frames therebetween may be displayed in response to receiving of the first and second time reference. The display of the information tags may be in accordance with FIGS. 2, 3 and 4 with the necessary modifications. For example, the information tags may be represented each by a symbol or all by a single symbol.

Although a part of the above disclosure, including figures and examples, may relate to metadata and/or information tags which include geographic information, the disclosed technique is not limited to metadata and/or information tags of geographic context and the disclosed above may be applied to metadata and/or information tags of different context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method comprising using at least one hardware processor for:
    receiving a video and metadata associated with the video wherein the video comprises frames associated with the metadata, the frames being of a plurality of sites, and wherein the metadata comprises geo-references to the plurality of sites correspondingly;
    retrieving one or more maps comprising the plurality of sites based on the geo-references;
    indicating, in a video player, a current time in the video;
    receiving an indication of a different time in the video; and
    responsive to said receiving of the indication, displaying a datum of the metadata, wherein the datum is correlated with the different time in the video, wherein the displaying of the datum comprises displaying a geographic location of a site of said plurality of sites of a frame of said frames associated with the datum based on its corresponding geo-reference, and wherein the geographic location is being displayed as a symbol superimposed correspondingly on a map of said one or more maps.

2. The method of claim 1, wherein the geo-references comprise geographic coordinates of the plurality of sites correspondingly.

3. The method of claim 2, wherein the retrieving of the one or more maps comprises:
    determining the maximal and minimal longitudes and latitudes of the geographic coordinates; and
    retrieving a map comprising at least an area restricted by said maximal and minimal longitudes and latitudes.

4. The method of claim 1, wherein the video comprises one or more frames of one or more sites which are not associated with metadata comprising corresponding geo-references, the method comprising using the at least one hardware processor further for interpolating geo-references for a frame of the one or more frames based on geo-references of metadata associated with adjacent frames of said frames indicated by the video player as temporally adjacent in the video to the frame.

5. The method of claim 1, further using the at least one hardware processor for displaying at least some of the remainder of the metadata, the displaying comprises displaying geographic locations of the associated at least some of the remainder of said plurality of sites as one or more symbols superimposed correspondingly on the map, wherein the displaying of the geographic locations is based on the associated at least some of the remainder of the geo-references and with respect to the displayed datum.

6. The method of claim 5, wherein the displaying of the at least some of the remainder of the metadata with respect to the displayed datum is in a temporal manner, wherein the at least some of the remainder of the metadata is correlated with time in the video indicated in the video player.

7. The method of claim 6, wherein the displaying of the at least some of the remainder of the metadata comprises color-coding of the one or more symbols according to a temporal sequence of the correlated time in the video indicated in the video player and with respect to the different time.

8. The method of claim 6, wherein the displaying of the at least some of the remainder of the metadata comprises determining the thickness of the delimiting line of a symbol of the one or more symbols to be with respect to the time difference between a time in the video corresponding to the symbol and the different time.

9. The method of claim 1, further using the at least one hardware processor for displaying the geographic distribution of at least some of the remainder of the plurality of sites on the map based on the associated at least some of the remainder of the geo-references and with respect to the displaying of the datum.

10. The method of claim 1, wherein said displaying comprises visualizing the datum and wherein visualizing the datum comprises processing the different time and the datum correlated with the different time.

11. The method of claim 10, wherein said processing is performed offline for each possible indication of time in the video.

12. The method of claim 10, wherein said processing is performed online.

13. The method of claim 1, wherein the receiving of an indication of a different time in the video comprises receiving a time location on a time bar of the video player indicated by an input device operated by a user of the video player.

14. The method of claim 1, wherein the metadata is selected from the group consisting of: geographic location, a subtitle, a video parameter and a camera parameter.

15. A computer program product comprising a non-transitory computer-readable storage medium having program code embodied therewith, the program code executable by at least one hardware processor to:
receive a video and metadata associated with the video;
indicate, in a video player, a current time in the video wherein the video comprises frames associated with the metadata, the frames being of a plurality of sites, and wherein the metadata comprises geo-references to the plurality of sites correspondingly;
retrieve one or more maps comprising the plurality of sites based on the geo-references;
indicate, in a video player, a current time in the video;
receive an indication of a different time in the video; and
responsive to said receiving of the indication, display a datum of the metadata, wherein the datum is correlated with the different time in the video, wherein the display of the datum comprises displaying a geographic location of a site of said plurality of sites of a frame of said frames associated with the datum based on its corresponding geo-reference, and wherein the geographic location is being displayed as a symbol superimposed correspondingly on a map of said one or more maps.

16. The computer program product of claim 15, wherein the program code is further executable by said one hardware processor to display the at least some of the remainder of the metadata, the display comprises displaying geographic locations of the associated at least some of the remainder of said plurality of sites as one or more symbols superimposed correspondingly on the map, wherein the displaying of the geographic locations is based on the associated at least some of the remainder of the geo-references and with respect to the displayed datum.

17. The computer program product of claim 15, wherein the receipt of an indication of a different time in the video comprises receiving a time location on a time bar of the video player indicated by an input device operated by a user of the video player.

* * * * *